United States Patent
Cheong

(10) Patent No.: US 9,109,514 B2
(45) Date of Patent: Aug. 18, 2015

(54) AIR RECOVERY SYSTEM FOR PRECOOLER HEAT-EXCHANGER

(75) Inventor: Chee Yuen Cheong, Hartford, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 42 days.

(21) Appl. No.: 13/347,044

(22) Filed: Jan. 10, 2012

(65) Prior Publication Data

US 2013/0175001 A1    Jul. 11, 2013

(51) Int. Cl.
*B64D 33/02* (2006.01)
*B64D 33/04* (2006.01)
*F02C 6/04* (2006.01)
*F02C 7/18* (2006.01)

(52) U.S. Cl.
CPC .............. *F02C 7/185* (2013.01); *Y02T 50/671* (2013.01); *Y02T 50/675* (2013.01)

(58) Field of Classification Search
CPC ........ B64D 15/02; B64D 15/04; B64D 33/02; B64D 33/04; F02C 6/04
USPC .......... 244/134 R, 134 B, 53 R, 53 B, 58, 57; 60/782, 806
See application file for complete search history.

(56) References Cited

U.S. PATENT DOCUMENTS

| | | | |
|---|---|---|---|
| 3,711,044 A * | 1/1973 | Matulich | 244/118.5 |
| 3,825,212 A * | 7/1974 | Darges et al. | 244/118.5 |
| 3,981,466 A * | 9/1976 | Shah | 244/134 R |
| 4,254,618 A | 3/1981 | Elovic | |
| 4,474,001 A | 10/1984 | Griffin et al. | |
| 4,482,114 A | 11/1984 | Gupta et al. | |
| 4,782,658 A | 11/1988 | Perry | |
| 5,269,133 A | 12/1993 | Wallace | |
| 5,269,135 A | 12/1993 | Vermejan et al. | |
| 5,317,877 A | 6/1994 | Stuart | |
| 5,392,614 A | 2/1995 | Coffinberry | |
| 5,581,996 A | 12/1996 | Koch et al. | |
| 5,782,077 A | 7/1998 | Porte | |
| 5,803,161 A * | 9/1998 | Wahle et al. | 165/104.21 |
| 5,967,461 A * | 10/1999 | Farrington | 244/118.5 |
| 6,134,880 A * | 10/2000 | Yoshinaka | 60/226.1 |
| 6,283,410 B1 * | 9/2001 | Thompson | 244/59 |
| 7,571,608 B2 * | 8/2009 | Boyapati et al. | 60/612 |
| 7,810,312 B2 | 10/2010 | Stretton et al. | |
| 7,856,824 B2 | 12/2010 | Anderson et al. | |
| 7,861,512 B2 | 1/2011 | Olver et al. | |
| 7,862,293 B2 | 1/2011 | Olver | |
| 2010/0139288 A1 * | 6/2010 | Rago | 60/785 |

* cited by examiner

Primary Examiner — Tien Dinh
Assistant Examiner — Michael Wang
(74) Attorney, Agent, or Firm — Kinney & Lange, P.A.

(57) ABSTRACT

A method for recovering air in an aircraft includes bleeding bypass air from an engine bypass, bleeding core air from an engine core, and placing the bypass air and the core air in a heat exchange relationship to produce heated bypass air and cooled core air. The method further includes directing the heated bypass air to one or more of: the engine bypass, a cowl de-icing system, and a wing anti-ice system.

10 Claims, 4 Drawing Sheets

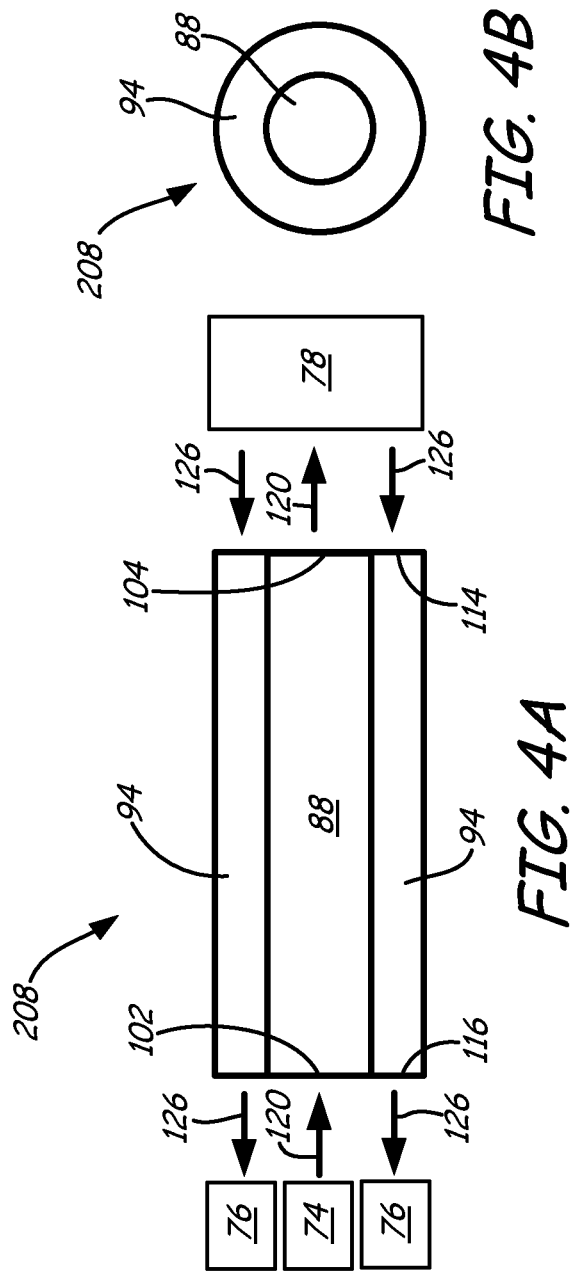

AIR RECOVERY SYSTEM FOR PRECOOLER HEAT-EXCHANGER

BACKGROUND

The present disclosure relates generally to an aircraft and more particularly, to systems and methods for recovering air in an aircraft having a gas turbine engine.

Most modern military and commercial aircraft are powered by gas turbine engines. It is known to extract bleed air from a gas turbine engine on an aircraft. Bleed air is relatively hot and often placed in a heat exchange relationship with a cooler fluid before further use by the engine or aircraft. The cooler fluid is typically oil, fuel, or ambient air. After cooling, the bleed air can be sent to hotter portions of the engine to provide a cooling function, or to a variety of other aircraft systems such as an Environmental Control System (ECS).

SUMMARY

A method for recovering air in an aircraft includes bleeding bypass air from an engine bypass, bleeding core air from an engine core, and placing the bypass air and the core air in a heat exchange relationship to produce heated bypass air and cooled core air. The method further includes directing the heated bypass air back to one or more of: the engine bypass, a cowl de-icing system, and wing anti-ice system.

A system for recovering air in an aircraft includes an engine core, an engine bypass surrounding the engine core, an air-to-air heat exchanger, and a first duct. The air-to-air heat exchanger has a first inlet, a second inlet, a first outlet, and a second outlet. The first inlet is fluidly connected to the engine bypass for receiving bypass bleed air and the second inlet is fluidly connected to the engine core for receiving core bleed air. The first duct is fluidly connected to the first outlet of the air-to-air heat exchanger for directing the bypass bleed air from the air-to-air heat exchanger to another location in the aircraft for further use.

A system for recovering air in an aircraft includes an engine core, an engine bypass, an air-to-air exchanger, and four ducts. The engine core includes a compressor, a combustor, and a turbine in flow series for compressing, combusting, and expanding working fluid, respectively. The engine bypass surrounds the engine core, and includes an upstream end receiving bypass air from an outer perimeter of a fan connected to the compressor. The first duct has an inlet and an outlet, where the inlet is connected to the engine core for receiving core bleed air. The second duct has an inlet and an outlet, where the inlet is connected to the engine bypass for receiving bypass bleed air. The air-to-air heat exchanger has a first inlet, a second inlet, a first outlet, and a second outlet. The first inlet of the air-to-air heat exchanger is connected to the outlet of the first duct. The second inlet of the air-to-air heat exchanger is connected to the outlet of the second duct. The air-to-air heat exchanger is configured to place the core bleed air in a heat exchange relationship with the bypass bleed air. The third duct has an inlet and an outlet, where the inlet is connected to the first outlet of the air-to-air heat exchanger for receiving core bleed air and where the outlet is connected to an aircraft system that utilizes the core bleed air. The fourth duct has an inlet and an outlet, where the inlet is connected to the second outlet of the air-to-air heat exchanger for receiving bypass bleed air and where the outlet is connected to an engine or aircraft system that utilizes the bypass bleed air.

BRIEF DESCRIPTION OF THE DRAWINGS

FIGS. 4A and 4B are schematic cross-sectional views of an air duct system for use with the aircraft bleed systems shown in FIGS. 2 and 3.

DETAILED DESCRIPTION

Figure 1:
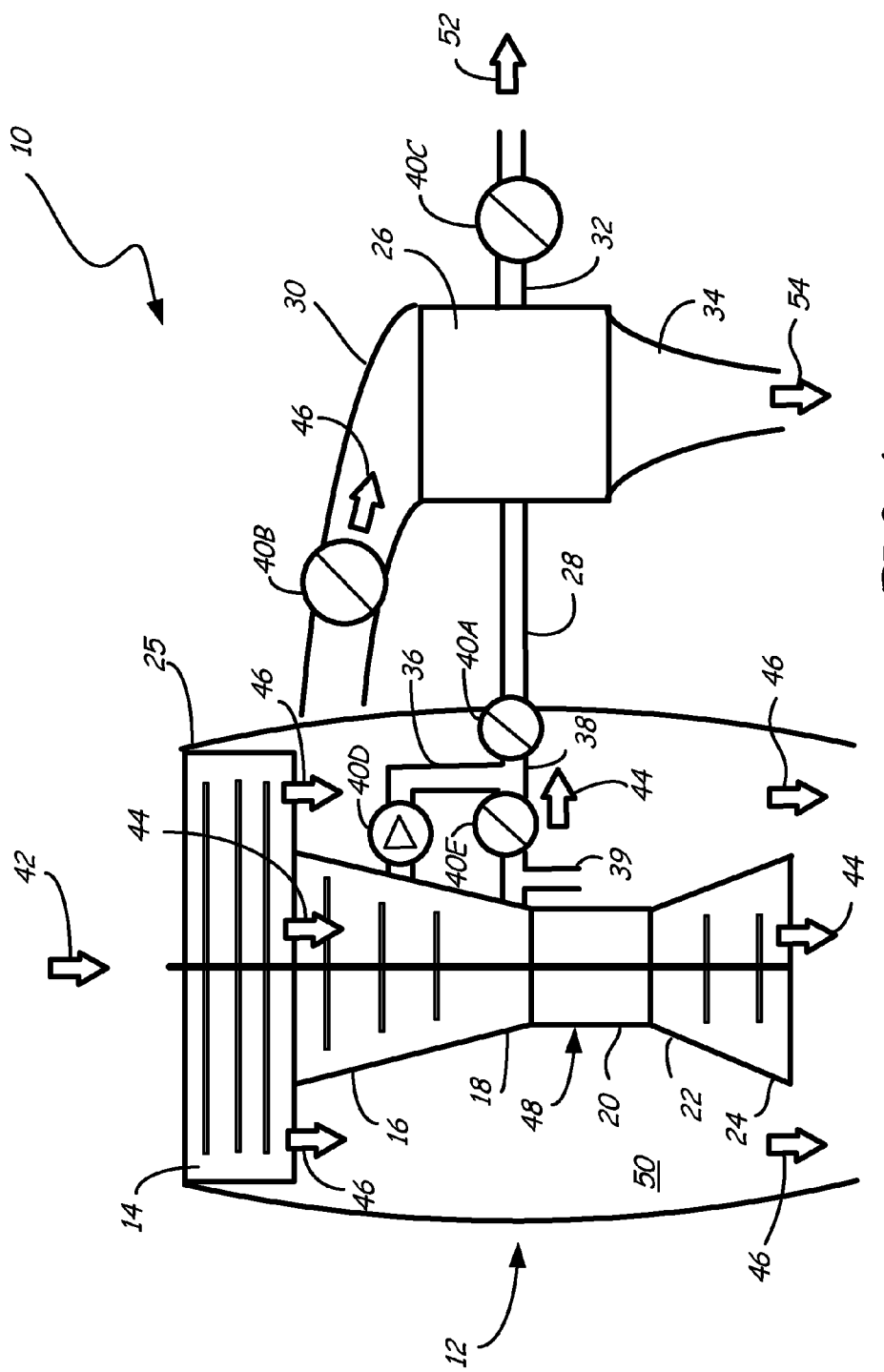
FIG. 1 is a schematic depicting an aircraft bleed system for a gas turbine engine in accordance with the prior art.

FIG. 1 is a schematic depicting aircraft bleed system 10 for gas turbine engine 12 in accordance with the prior art. Engine 12 includes fan 14, low pressure compressor (LPC) 16, high pressure compressor (HPC) 18, combustor 20, high pressure turbine (HPT) 22, low pressure turbine (LPT) 24, and cowl 25. Heat exchanger 26 includes first duct 28, second duct 30, third duct 32, fourth duct 34, fifth duct 36, six duct 38, seventh duct 39, and valves 40A-40E. Ambient air 42, core air 44, bypass air 46, engine core 48, engine bypass 50, cooled core bleed air 52 and heated bypass bleed air 54 are also identified. During operation of gas turbine engine 12, core air 44 and bypass air 46 are placed into heat exchanger 26 to create cooled core bleed air 52 and heated bypass bleed air 54. While engine 12 is described as a two shaft design (i.e. LPC 16 & LPT 24 on a first shaft and HPC 18 & HPT 22 on a second shaft), a three shaft design (i.e. LPC & LPT on a first shaft, IPC & IPT on a second shaft, and HPC & HPT on a third shaft) is also possible.

Located within gas turbine engine 12 and arranged in flow series are fan 14, LPC 16, HPC 18, combustor 20, HPT 22, and LPT 24. LPC 16 is mechanically coupled to LPT 24 by a low pressure shaft and HPC 18 is mechanically coupled to HPT 22 by a high pressure shaft. LPC 16, HPC 18, combustor 20, HPT 22, and LPT 24 form engine core 48. The area immediately surrounding engine core 48, but located within nacelle 25 of gas turbine engine 12, is engine bypass 50.

In operation, ambient air 42 enters an upstream end of gas turbine engine 12 at fan 14, where it is split into working or core air 44 and bypass air 46. Core air 44 is serially compressed by LPC 16 and HPC 18. The compressed core air 44 then enters combustor 20, where it is mixed with fuel and combusted. Combusted core air 44 enters HPT 22 and LPT 24 where it is serially expanded and forces one or both of the turbines to rotate, which drives fan 14, LPC 16 and HPC 18. Expanded core air 44 is exhausted from a downstream end of gas turbine engine 12. While core air 44 flows through engine core 48 (i.e. LPC 16, HPC 18, combustor 20, HPT 22, and LPT 24), bypass air 46 flows through engine bypass 50. The combination of core air 44 and bypass air 46 provide a propulsive force for an aircraft.

Through compression, core air 44 becomes pressurized and relatively hot. A portion of core air 44 is bled off at either LPC 16 or HPC 18 and directed to heat exchanger 26. More specifically, fifth duct 36 directs core air 44 from LPC 16 to first duct 28 or sixth duct 38 directs core air 44 from HPC 18 to first duct 28. Whether core air 44 is bleed from fifth duct 36 or sixth duct 38 depends upon a pre-determined switch-over pressure threshold. First duct 28 directs core air 44 to heat exchanger 26. Additional air may be bled from HPC 18 and sent through seventh duct 39 to an anti-icing system. Valve 40A located is located on first duct 28, valve 40D is located on fifth duct 36, and valve 40E is located on sixth duct 38 to control flow of core air 44 to heat exchanger 26. In comparison to core air 44, bypass air 46 is relatively cool. A portion of bypass air 46 is bled from an upstream portion of bypass 50

(i.e. just downstream of fan 14) and directed by second duct 30 to heat exchanger 26. Valve 40B is located on second duct 30 to control flow of bypass air 46 to heat exchanger 26. Within heat exchanger 26, the cooler bypass air 46 is used as a heat sink for hotter core air 44. In other words, core air 44 and bypass air 46 are placed in a heat exchange relationship to produce cooled core bleed air 52 and heated bypass bleed air 54.

Figure 2:
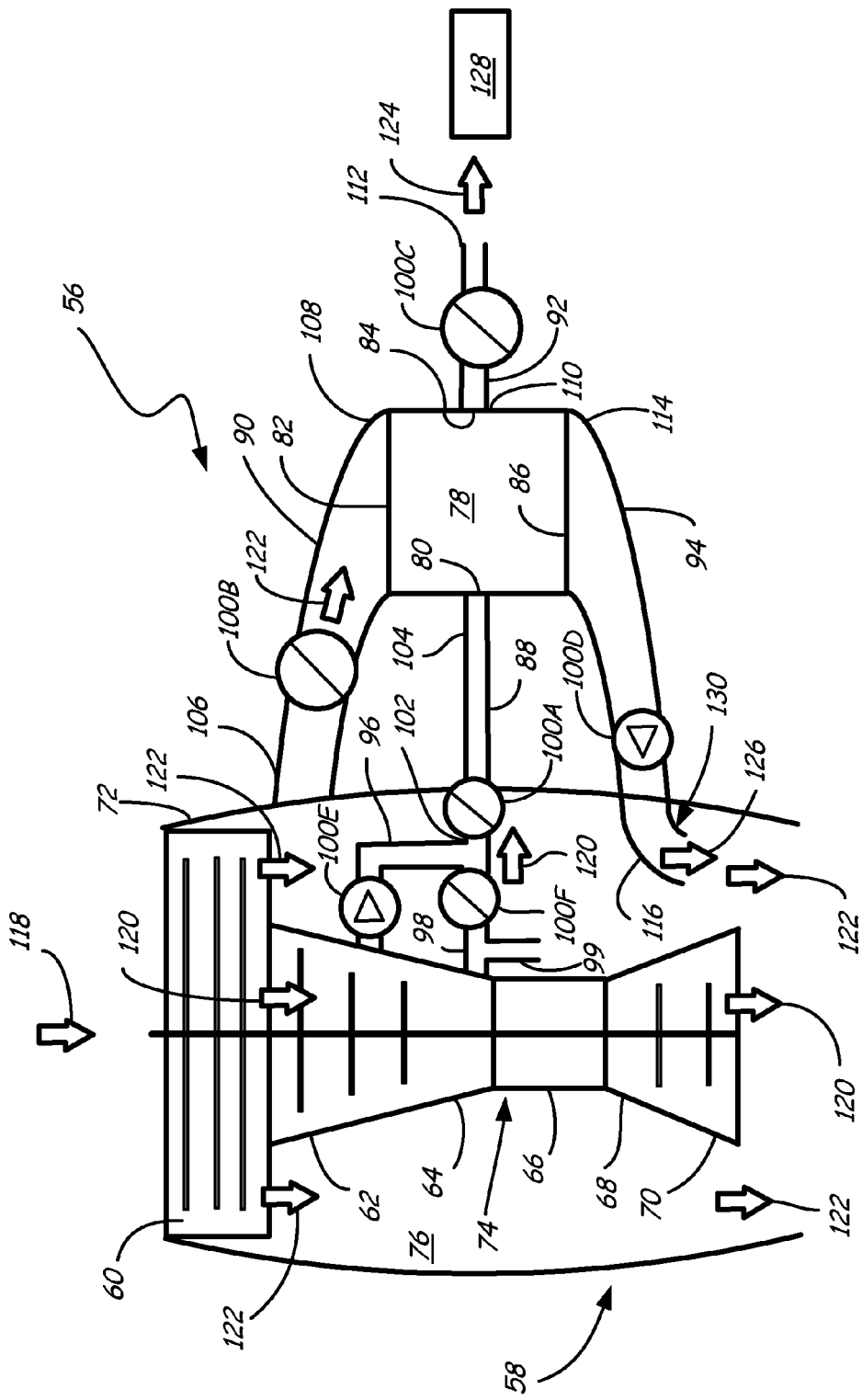
FIG. 2 is a schematic depicting an aircraft bleed system for a gas turbine engine in accordance with a first embodiment of the present disclosure.
Figure 3:
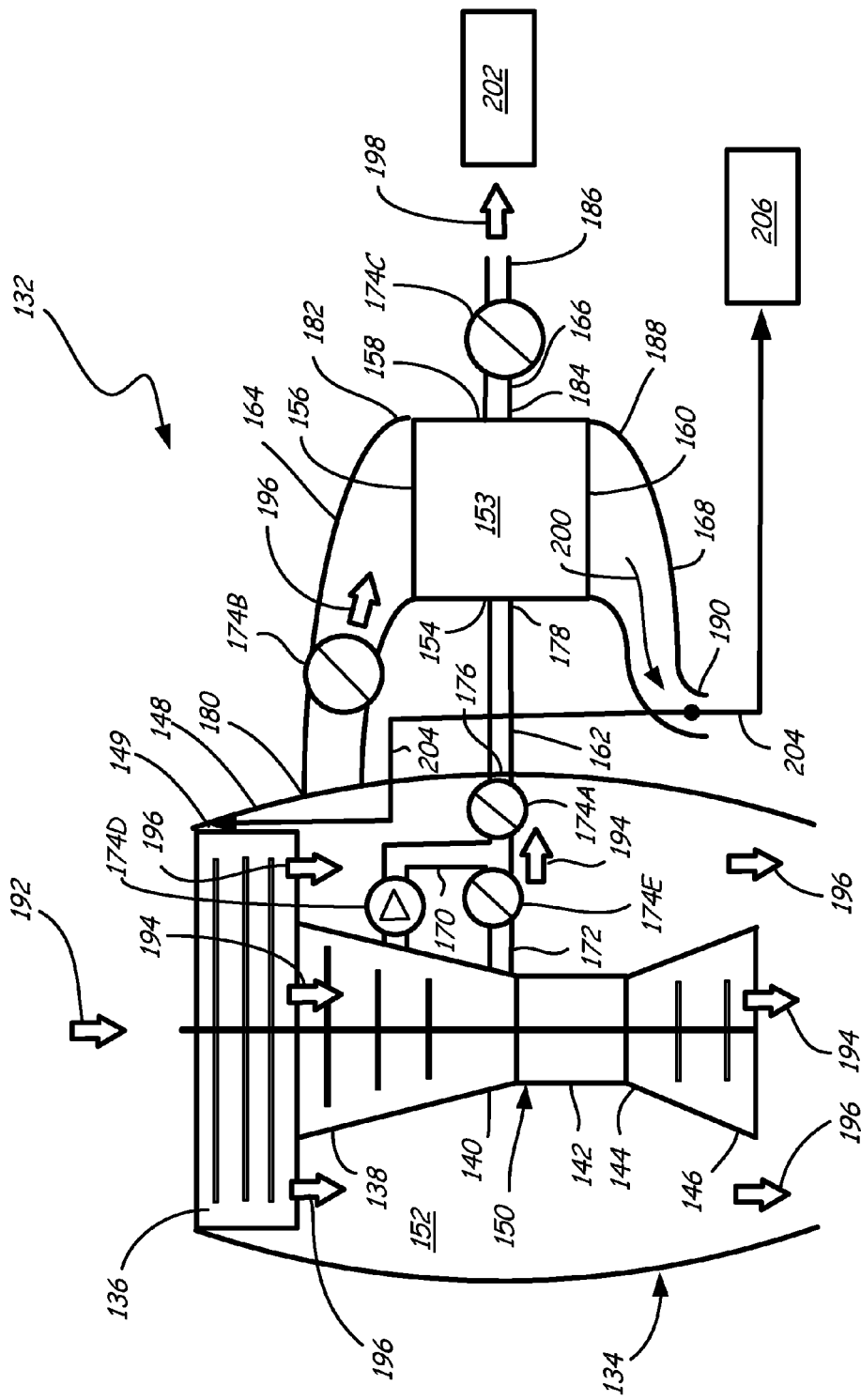
FIG. 3 is a schematic depicting an aircraft bleed system for a gas turbine engine in accordance with a second embodiment of the present disclosure.

Cooled core bleed air 52 exits heat exchanger 26 through third duct 32. Third duct 32 directs cooled core bleed air 52 to another location on the aircraft for further use (e.g. environmental control system or wing anti-ice system). Valve 40C is located on third duct 32 to control flow of cooled core bleed air 52 through third duct 32. Heated bypass bleed air 54 exits heat exchanger 26 through fourth duct 34 and is exhausted overboard back to the ambient air surrounding the aircraft. This "dumping" of heated bypass bleed air 54 to the atmosphere is wasteful and results in a performance loss for gas turbine engine 12. The present disclosure provides methods and systems for recovering heated bypass bleed air 54. As shown in FIGS. 2-3 and described below, heated bypass bleed air 54 can be reused to regain a portion of lost performance and improve fuel consumption.

FIG. 2 is a schematic depicting aircraft bleed system 56 for gas turbine engine 58 in accordance with a first embodiment of the present disclosure. Engine 58 includes fan 60, low pressure compressor (LPC) 62, high pressure compressor (HPC) 64, combustor 66, high pressure turbine (HPT) 68, low pressure turbine (LPT) 70, nacelle 72, engine core 74, and engine bypass 76. Heat exchanger 78 includes first inlet 80, second inlet 82, first outlet 84, second outlet 86, first duct 88, second duct 90, third duct 92, fourth duct 94, fifth duct 96, six duct 98, seventh duct 99, and valves 100A-100F. First duct 88 has inlet 102 and outlet 104, second duct 90 has inlet 106 and outlet 108, third duct 92 has inlet 110 and outlet 112, and fourth duct 94 has inlet 114 and outlet 116. Ambient air 118, core air 120, bypass air 122, cooled core bleed air 124, heated bypass bleed air 126, aircraft system 128, and aft face scoop 130 are also identified. During operation of gas turbine engine 58, a portion of core air 120 and a portion of bypass air 122 are placed into heat exchanger 78 to create cooled core bleed air 124 and heated bypass bleed air 126. Cooled core bleed air 124 is directed to aircraft system 128 for use and heated bypass bleed air 126 is routed to engine bypass 76 for use.

Gas turbine engine 58 is similar to gas turbine engine 12 described above. Located within gas turbine engine 58 and arranged in flow series are fan 60, LPC 62, HPC 64, combustor 66, HPT 68, and LPT 70. LPC 62 is mechanically coupled to LPT 70 by a low pressure shaft and HPC 64 is mechanically coupled to HPT 68 by a high pressure shaft. LPC 62, HPC 64, combustor 66, HPT 68, and LPT 70 form engine core 74. The area immediately surrounding engine core 74, but located within nacelle 72 of gas turbine engine 58, is engine bypass 76.

In operation, ambient air 118 enters an upstream end of gas turbine engine 58 at fan 60, where it is split into working or core air 120 and bypass air 122. Core air 120 is located radially inward and is serially compressed by LPC 62 and HPC 64. The compressed core air 120 then enters combustor 66, where it is mixed with fuel and combusted. Combusted core air 120 enters HPT 68 and LPT 70 where it is serially expanded and forces one or both of the turbines to rotate, which drives fan 60, LPC 62 and HPC 64. Expanded core air 120 is exhausted from a downstream end of gas turbine engine 58 to the atmosphere. While core air 120 flows through engine core 74 (i.e. LPC 62, HPC 64, combustor 66, HPT 68, and LPT 70), bypass air 122 is located radially outward and flows through engine bypass 76. The combination of core air 120 and bypass air 122 provide a propulsive force for an aircraft.

Through compression, core air 120 becomes pressurized and relatively hot. A portion of core air 120 is bled off at either LPC 62 or HPC 64 and directed to heat exchanger 78. More specifically, fifth duct 96 directs a portion of core air 120 from LPC 62 to first duct 88 or sixth duct 98 directs a portion of core air 120 from HPC 64 to first duct 88. Whether core air 120 is bleed from fifth duct 96 or sixth duct 98 depends upon a pre-determined switch-over pressure threshold. First duct 88 has inlet 102 attached to fifth duct 96 and sixth duct 98, and outlet 104 attached to first inlet 80 of heat exchanger 78. First duct 88 directs core air 120 to first inlet 80 of heat exchanger 78. Valve 100A is located on each of first duct 88, valve 100E is located on fifth duct 96, and valve 100F is located on sixth duct 98 to control flow of core air 120 to heat exchanger 78. Additional air may be bled from HPC 64 and sent through seventh duct 99 to an anti-icing system. Second duct 90 has inlet 106 attached to an upstream portion of bypass 76 (i.e. just downstream of fan 60) and outlet 108 attached to second inlet 82 of heat exchanger 78. A portion of bypass air 122 is directed by second duct 90 to heat exchanger 78. Valve 100B is located on second duct 90 to control flow of bypass air 122 to heat exchanger 78. In comparison to core air 120, bypass air 122 is relatively cool. Within heat exchanger 78, cooler bypass air 122 is used as a heat sink for hotter core air 120. In other words, core air 120 (about 1000° F./538° C.) and bypass air 122 (about 75° F./24° C.) are placed in a heat exchange relationship thereby producing cooled core bleed air 124 (about 450° F./232° C.) and heated bypass bleed air 126 (about 700° F./371° C.). These temperature values are presented as "typical" and are included for completeness without limiting the present disclosure. Both bypass air 122 and core air 120 temperatures will change continuously during flight.

Inlet 110 of third duct 92 is attached to first outlet 84 of heat exchanger 78, and outlet 112 is connected to aircraft system 128. Cooled core bleed air 126 exits first outlet 84 of heat exchanger 78 and travels through third duct 92 to aircraft system 112. Aircraft system 122 is an environmental control system, wing anti-ice system, or other aircraft system that utilizes cooled core air 124. Valve 100C is located on third duct 92 to control flow of cooled core bleed air 124 to aircraft system 112. Inlet 114 of fourth duct 94 is attached to second outlet 86 of heat exchanger 78, and outlet 116 is connected to engine bypass 76. Heated bypass bleed air 126 exits second outlet 86 of heat exchanger 78 and travels through fourth duct 94 to engine bypass 76. Fourth duct 94 can include valve 100D for preventing reversal of heated bypass bleed air 126 en-route to engine bypass 76. Outlet 116 of fourth duct 94 terminates in aft face scoop 130. Aft face scoop 130 can be circular or rectangular, but preferably protrudes and faces downstream within engine bypass 76. So designed, aft face scoop 130 creates a pressure differential for heated bypass bleed air 126 and operates as an ejector pump in engine bypass 76.

The return of heated bypass bleed air 126 to engine bypass 76 benefits gas turbine engine 58 by substantially decreasing the performance loss associated with bleeding and dumping bypass air (see heated bypass bleed air 54 being dumped to the atmosphere by aircraft bleed system 10 in FIG. 1). In contrast to the prior art aircraft bleed system 10 of FIG. 1, aircraft bleed system 56 of FIG. 2 recovers heated bypass bleed air 126 by returning this air to engine bypass 76 thereby increasing engine 58 thrust. Aircraft bleed system 56 improves fuel consumption for gas turbine engine 58, thereby making it more environmentally friendly. Additionally, the proposed aircraft bleed system 56 avoids issues such as air flow discrepancies and heat dumping associated with the prior art aircraft bleed system 10.

FIG. 3 is a schematic depicting aircraft bleed system 132 for gas turbine engine 134 in accordance with a second embodiment of the present disclosure. Engine 134 includes fan 136, low pressure compressor (LPC) 138, high pressure compressor (HPC) 140, combustor 142, high pressure turbine (HPT) 144, low pressure turbine (LPT) 146, nacelle 148, cowl 149, engine core 150, and engine bypass 152. Heat exchanger 153 includes first inlet 154, second inlet 156, first outlet 158, second outlet 160, first duct 162, second duct 164, third duct 166, fourth duct 168, fifth duct 170, six duct 172, and valves 174A-174E. First duct 162 has inlet 176 and outlet 178, second duct 164 has inlet 180 and outlet 182, third duct 166 has inlet 184 and outlet 186, and fourth duct 168 has inlet 188 and outlet 190. Ambient air 192, core air 194, bypass air 196, cooled core bleed air 198, heated bypass bleed air 200, aircraft system 202, de-icing system 204, and wing 206 are also identified. During operation of gas turbine engine 134, a portion of core air 194 and a portion of bypass air 196 are placed into heat exchanger 153 to create cooled core bleed air 198 and heated bypass bleed air 200. Cooled core bleed air 198 is directed to aircraft system 202 for use and heated bypass bleed air 200 is routed to anti-icing system 204 for use at cowl 149 and wing 206.

Gas turbine engine 134 is similar to gas turbine engine 58 described above. Located within gas turbine engine 134 and arranged in flow series are fan 136, LPC 138, HPC 140, combustor 142, HPT 144, and LPT 146. LPC 138 is mechanically coupled to LPT 146 by a low pressure shaft and HPC 140 is mechanically coupled to HPT 144 by a high pressure shaft. LPC 138, HPC 140, combustor 142, HPT 144, and LPT 146 form engine core 150. The area immediately surrounding engine core 150, but located within nacelle 148 of gas turbine engine 134, is engine bypass 152. Cowl 149 is surrounds fan 136 at engine 134 inlet.

In operation, ambient air 192 enters an upstream end of gas turbine engine 134 at fan 136, where it is split into working or core air 194 and bypass air 196. Core air 194 is located radially inward and is serially compressed by LPC 138 and HPC 140. The compressed core air 194 then enters combustor 142, where it is mixed with fuel and combusted. Combusted core air 194 enters HPT 144 and LPT 146 where it is serially expanded and forces one or both of the turbines to rotate, which drives fan 136, LPC 138 and HPC 140. Expanded core air 194 is exhausted from a downstream end of gas turbine engine 134 to the atmosphere. While core air 194 flows through engine core 150 (i.e. LPC 138, HPC 140, combustor 142, HPT 144, and LPT 146), bypass air 196 is located radially outward and flows through engine bypass 152. The combination of core air 194 and bypass air 196 provide a propulsive force for powering an aircraft.

Through compression, core air 194 becomes pressurized and relatively hot. A portion of core air 194 is bled off at either LPC 138 or HPC 140 and directed to heat exchanger 153. More specifically, fifth duct 170 directs a portion of core air 194 from LPC 138 to first duct 162 or sixth duct 172 directs a portion of core air 194 from HPC 140 to first duct 162. First duct 162 has inlet 176 attached to fifth duct 170 and sixth duct 172, and outlet 178 attached to first inlet 154 of heat exchanger 153. First duct 162 directs core air 184 to first inlet 154 of heat exchanger 153. Valve 174A is located on first duct 162, valve 174D is located fifth duct 170, and valve 174E is located on sixth duct 172 to control flow of core air 194 to heat exchanger 153. Second duct 164 has inlet 180 attached to an upstream portion of bypass 152 (i.e. just downstream of fan 136) and outlet 182 attached to second inlet 156 of heat exchanger 153. A portion of bypass air 196 is directed by second duct 164 to heat exchanger 153. Valve 174B is located on second duct 164 to control flow of bypass air 196 to heat exchanger 153. In comparison to core air 194, bypass air 196 is relatively cool. Within heat exchanger 153, the cooler bypass air 196 is used as a heat sink for the hotter core air 194. In other words, core air 194 (about 1000° F./538° C.) and bypass air 196 (about 75° F./24° C.) are placed in a heat exchange relationship thereby producing cooled core bleed air 198 (about 450° F./232° C.) and heated bypass bleed air 200 (about 700° F./371° C.). These temperature values are presented as "typical" and are included for completeness without limiting the present disclosure. Both bypass air 196 and core air 194 temperatures will change continuously during flight.

Inlet 184 of third duct 166 is attached to first outlet 158 of heat exchanger 153, and outlet 186 is connected to aircraft system 202. Cooled core bleed air 198 exits first outlet 158 of heat exchanger 153 and travels through third duct 166 to aircraft system 202. Aircraft system 202 is, for example, an environmental control system that utilizes cooled core bleed air 198. Valve 174C is located on third duct 166 to control flow of cooled core bleed air 198 to aircraft system 202. Inlet 188 of fourth duct 168 is attached to second outlet 160 of heat exchanger 153, and outlet 190 is connected to anti-ice system 206. Heated bypass bleed air 200 exits second outlet 160 of heat exchanger 153 and travels through fourth duct 168 to anti-ice system 204. Fourth duct 168 could also include a valve for controlling flow of heated bypass bleed air 200 to anti-ice system 204. Anti-ice system 204 sends heated bypass bleed air 200 to cowl 149 for de-icing and to wing 206 for anti-icing purposes.

The use of heated bypass bleed air 200 for anti-icing system 204 benefits gas turbine engine 58 by substantially decreasing the performance loss associated with bleeding and dumping bypass air (see heated bypass bleed air 54 being dumped by aircraft bleed system 10 to the atmosphere in FIG. 1). In the prior art aircraft bleed system 10 of FIG. 1, HPC 18 bleed air is sent through seventh duct 39 to supply anti-icing functions for the aircraft. The present aircraft bleed system 132 replaces the core air 194 bleed from HPC 140 with heated bypass bleed air 200 for use by wing anti-ice system 204. By removing additional bleeding from engine core 150, overall performance of engine 134 is improved. Additionally, the proposed aircraft bleed system 132 avoids issues such as air flow discrepancies and heat dumping associated with the prior art aircraft bleed system 10.

FIGS. 4A and 4B are schematic cross-sectional views of an example air duct system 208 for use with aircraft bleed systems 56 and 132 depicted in FIGS. 2 and 3, respectively. FIGS. 4A and 4B show certain elements of aircraft bleed system 56 as they apply to air duct system 208: engine core 74, engine bypass 76, heat exchanger 78, first duct 88, fourth duct 94, inlet 102 and outlet 104 of first duct 88, inlet 114 and outlet 116 of fourth duct 94, core air 120, and heated bypass bleed air 126. Although air duct system 208 is described particularly for use with aircraft bleed system 56, it is equally possible to use air duct system 208 with aircraft bleed system 132. Air duct system 208 provides for a heat exchange relationship between core air 120 flowing to heat exchanger 78 and heated bypass bleed air 126 flowing to engine bypass 76.

As described above with reference to FIG. 2, a portion of core air 120 from engine core 74 travels through first duct 88 (from inlet 102 to outlet 104) en route to heat exchanger 78. Heated bypass bleed air 126 from heat exchanger 78 travels through fourth duct 94 (from inlet 114 to outlet 116) en route to engine bypass 126. In air duct system 208, first duct 88 is an inner duct completely surrounded by fourth duct 94, an outer duct. In some instances, fourth duct 94 may surround only a portion, such as a latter portion, of first duct 88. Accordingly, heated bypass bleed air 126 leaving heat exchanger 78 is "piggy-backing" the space on the portion of core air 120 being supplied to heat exchanger 78.

The configuration of air duct system 208 places core air 120 in a heat exchange relationship with heated bypass bleed air 126. Core air 120 will be relatively hot in comparison to heated bypass bleed air 126, and accordingly core air 120 will be cooled by dumping some heat into heated bypass bleed air 126. If air duct system 208 is utilized for aircraft bleed system 56, core air 120 arriving in heat exchanger 78 will be cooler than expected with a conventional ducting system. This reduction of heat in core air 120 may reduce the anticipated size and weight of heat exchanger 78, thereby offsetting the additional weight of fourth duct 94 and benefiting the overall design of aircraft bleed system 56. An alternative to air duct system 208 would be the separation of first duct 88 and fourth duct 94, but placing the ducts in close proximity to each other.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method for recovering air in an aircraft, the method comprising:
   bleeding a portion of bypass air from an engine bypass;
   bleeding a portion of core air from an engine core;
   placing the bled bypass air and the bled core air in a heat exchange relationship external to an engine nacelle to produce heated bypass bleed air and cooled core bleed air; and
   directing the heated bypass bleed air separately from the cooled core bleed air to one or more of: a cowl de-icing system, and a wing anti-ice system.

2. The method of claim 1, wherein the portion of core air is bled from a low pressure compressor.

3. The method of claim 1, wherein the portion of core air is bled from a high pressure compressor.

4. A system for recovering air in an aircraft, the system comprising:
   an engine core;
   an engine bypass surrounding the engine core;
   an air-to-air heat exchanger external to an engine nacelle, the heat exchanger having a first inlet, a second inlet, a first outlet, and a second outlet, the second inlet fluidly connected to the engine bypass to receive a portion of bypass air that is bled from the engine bypass, the first inlet fluidly connected to the engine core to receive a portion of core air that is bled from the engine core; and
   a fourth duct fluidly connected to the second outlet of the air-to-air heat exchanger for directing heated bled bypass air from the heat exchanger to another location in the aircraft for further use, the fourth duct directing only heated bled bypass air, wherein the fourth duct is connected to one or more of: a cowl de-icing system and a wing anti-ice system.

5. The system of claim 4, further comprising:
   a first duct fluidly connecting the engine core to the first inlet of the heat exchanger to direct the bled core air from the engine core to the heat exchanger; and
   a third duct fluidly connected to the first outlet of the air-to-air heat exchanger to direct bled core air from the heat exchanger away from the heat exchanger, the third duct directing only bled core air.

6. The system of claim 5, wherein the first duct and the fourth duct are located proximate to each other in a heat exchange relationship.

7. The system of claim 5, wherein the fourth duct surrounds the first duct in a heat exchange relationship.

8. A system for recovering air in an aircraft, the system comprising:
   an engine core including a compressor, a combustor, and a turbine in flow series for compressing, combusting, and expanding working fluid, respectively;
   an engine bypass surrounding the engine core, the engine bypass including an upstream end receiving bypass air from an outer perimeter of a fan connected to the compressor;
   a first duct having an inlet and an outlet, the inlet connected to the engine core to receive a portion of core air that is bled from the engine core;
   a second duct having an inlet and an outlet, the inlet connected to the engine bypass to receive a portion of bypass air that is bled from the engine bypass;
   an air-to-air heat exchanger having a first inlet, a second inlet, a first outlet, and a second outlet, the first inlet connected to the outlet of the first duct, the second inlet connected to the outlet of the second duct, the air-to-air heat exchanger external to an engine nacelle configured to place the bled core air in a heat exchange relationship with the bled bypass air;
   a third duct having an inlet and an outlet, the inlet connected to the first outlet of the air-to-air heat exchanger for receiving cooled bled core air from the heat exchanger and the outlet connected to an aircraft system that utilizes the cooled bled core air; and
   a fourth duct having an inlet and an outlet, the inlet connected to the second outlet of the heat exchanger for receiving heated bled bypass air and the outlet connected to deliver the heated bled bypass air to one or more of: a cowl de-icing system and a wing anti-icing system.

9. The system of claim 8, wherein the first duct and the fourth duct are adjacent to one another in a heat exchange relationship.

10. The system of claim 8, wherein the fourth duct surrounds a portion of the first duct in a heat exchange relationship.

* * * * *